(12) United States Patent
Madan et al.

(10) Patent No.: US 9,420,020 B2
(45) Date of Patent: Aug. 16, 2016

(54) TARGET CONTENT VIDEO DELIVERY

(71) Applicant: Cisco Technology, Inc., San Jose, CA (US)

(72) Inventors: Rajeev Madan, Cary, NC (US); Sudipto Mukherjee, Morrisville, NC (US); Vijaya Mandava, Cary, NC (US)

(73) Assignee: Cisco Technology, Inc., San Jose, CA (US)

( * ) Notice: Subject to any disclaimer, the term of this patent is extended or adjusted under 35 U.S.C. 154(b) by 14 days.

(21) Appl. No.: 13/964,538

(22) Filed: Aug. 12, 2013

(65) Prior Publication Data

US 2015/0046514 A1 Feb. 12, 2015

(51) Int. Cl.
| | |
|---|---|
| G06F 15/16 | (2006.01) |
| H04L 29/06 | (2006.01) |
| G06Q 30/00 | (2012.01) |
| H04L 29/08 | (2006.01) |
| H04M 3/51 | (2006.01) |

(52) U.S. Cl.
CPC .......... *H04L 65/4069* (2013.01); *G06Q 30/016* (2013.01); *H04L 65/1069* (2013.01); *H04L 65/1093* (2013.01); *H04L 65/4015* (2013.01); *H04L 67/10* (2013.01); *H04L 67/14* (2013.01); *H04L 67/42* (2013.01); *H04M 3/5191* (2013.01); *H04M 2201/50* (2013.01)

(58) Field of Classification Search
CPC ............... H04L 29/06176; H04L 29/06197; H04L 29/06285; H04L 65/1069; H04L 65/4015; H04L 67/14
USPC .................. 709/206, 219, 231; 370/352, 389; 707/3; 379/265.01, 265.07; 715/730
See application file for complete search history.

(56) References Cited

U.S. PATENT DOCUMENTS

| | | | |
|---|---|---|---|
| 6,754,335 | B1 | 6/2004 | Shaffer et al. |
| 7,222,163 | B1 * | 5/2007 | Girouard et al. .............. 709/219 |
| 7,260,564 | B1 * | 8/2007 | Lynn et al. |
| 7,457,404 | B1 * | 11/2008 | Hession et al. .......... 379/265.07 |
| 7,787,609 | B1 * | 8/2010 | Flockhart et al. ........ 379/265.01 |
| 7,792,277 | B2 | 9/2010 | Shaffer et al. |
| 8,259,152 | B2 | 9/2012 | Eriksson et al. |

(Continued)

FOREIGN PATENT DOCUMENTS

WO 2013017165 A1 2/2013

OTHER PUBLICATIONS

David Skiba, George Erhart, Ramanujan Kashi, Valentine Matula; "Dynamic Video Delivery in Contact Centers"; WOWMOM '08 Proceedings of the 2008 International Symposium on a World of Wireless, Mobile and Multimedia Networks; pp. 1-6.*

(Continued)

*Primary Examiner* — Dustin Nguyen
(74) *Attorney, Agent, or Firm* — Lempia Summerfield Katz LLC

(57) ABSTRACT

A call manager is configured to establish an initial session between an agent and a user. A play request or a hold request from an agent device includes a video index value based on information from the user. The call manager interrupts the initial session between the agent device and the user device in response to the request and sends an invite message including the video index value to a media server. The media server accesses a video database based on the video index value for a video and establishes a communication session with the client endpoint device. The communication session includes a stream of the video from the video database.

15 Claims, 5 Drawing Sheets

(56) References Cited

U.S. PATENT DOCUMENTS

| | | | |
|---|---|---|---|
| 8,972,507 B1* | 3/2015 | Hendren et al. | 709/206 |
| 2002/0059378 A1* | 5/2002 | Mustafa | 709/205 |
| 2002/0136167 A1 | 9/2002 | Steele et al. | |
| 2002/0143972 A1* | 10/2002 | Christopoulos et al. | 709/231 |
| 2007/0171903 A1* | 7/2007 | Zeng et al. | 370/389 |
| 2010/0071021 A1* | 3/2010 | Friedman | 725/133 |
| 2010/0100601 A1* | 4/2010 | Zhu | 709/206 |
| 2011/0090898 A1* | 4/2011 | Patel et al. | 370/352 |
| 2012/0124476 A1* | 5/2012 | Chang | 715/730 |
| 2012/0218372 A1 | 8/2012 | Zhan | |
| 2013/0018788 A1* | 1/2013 | Johnson et al. | 705/43 |
| 2013/0028396 A1 | 1/2013 | Pasi et al. | |
| 2013/0039483 A1 | 2/2013 | Wolfeld et al. | |

OTHER PUBLICATIONS

J. Rosenberg et al., SIP: Session Initiation Protocol, Jun. 2002, Network Working Group.

N. Greene et al., Media Gateway Control Protocol Architecture and Requirements, Apr. 2000, Network Working Group.

International Search Report, from PCT/US2014/050522, Nov. 27, 2014, WO.

International Preliminary Report on Patentability PCT/US2014/050522, mailed Feb. 16, 2016.

* cited by examiner

TARGET CONTENT VIDEO DELIVERY

TECHNICAL FIELD

This disclosure relates in general to the field of video content delivery, and more specifically, to a call center environment directing video content delivery.

BACKGROUND

A customer who has some specific set of questions or needs a specific service from a company may visit a branch location of the company to speak to an expert on an issue. A bank is an example company with branch locations that employ experts at the branch locations. Each branch location may have a mortgage expert, an investment expert, or other specialized experts that answer questions from customers who walk into the branch location. However, employing experts at multiple branch location is expensive and redundant. Many companies have centralized these customer service functions at a central location. A centralized call center may receive calls related to customer inquiries.

BRIEF DESCRIPTION OF THE DRAWINGS

Exemplary embodiments of the present embodiments are described herein with reference to the following drawings.

DESCRIPTION OF EXAMPLE EMBODIMENTS

Overview

In one embodiment, an initial session is established between an agent device and a user device. A play request is received from the agent device and includes a video index value. The initial session between the agent device and the user device is interrupted in response to the play request and an invite is generated and sent to a media server. The invite message includes the video index value.

In another embodiment, a media server receives an invite message from a call manager. The invite message includes an address for a client endpoint device and includes a video request based on a request from the client endpoint device. Based pm the video request, the media server accesses a video database for a video corresponding to the video request and establishes a communication session with the client endpoint device. The communication session includes the video from the video database.

Example Embodiments

A customer who has a question or needs a specific service from a business visits a branch location. The branch location, instead of having an expert present in each branch location, has a video kiosk in the branch location configured to route a call to a call center that is equipped with a set of agents. The call is delivered to an available agent. After the customer explains the reason for the call, the agent decides that the customer should be played a specific video content to answer most or all of the questions that the customer has. The agent selects a video stream to be played to the customer. The video communication between the customer and the agent is interrupted and replaced with the selected video stream, freeing the agent to respond to requests from other callers.

This type of targeted content delivery in a centralized video call center environment brings benefits to the both the agent and the customer. The agent more effectively and efficiently addresses the needs of the customer. More customers may be assisted by a single agent, and the customer receives more specialized advice in a shorter amount of time and compares to existing contact center deployment. The agent has a choice of what video content to play based on the needs of the customer which provides valuable benefits over the existing contact center deployments. For example, existing contact center deployments may be limited to streaming hold music.

Figure 1:
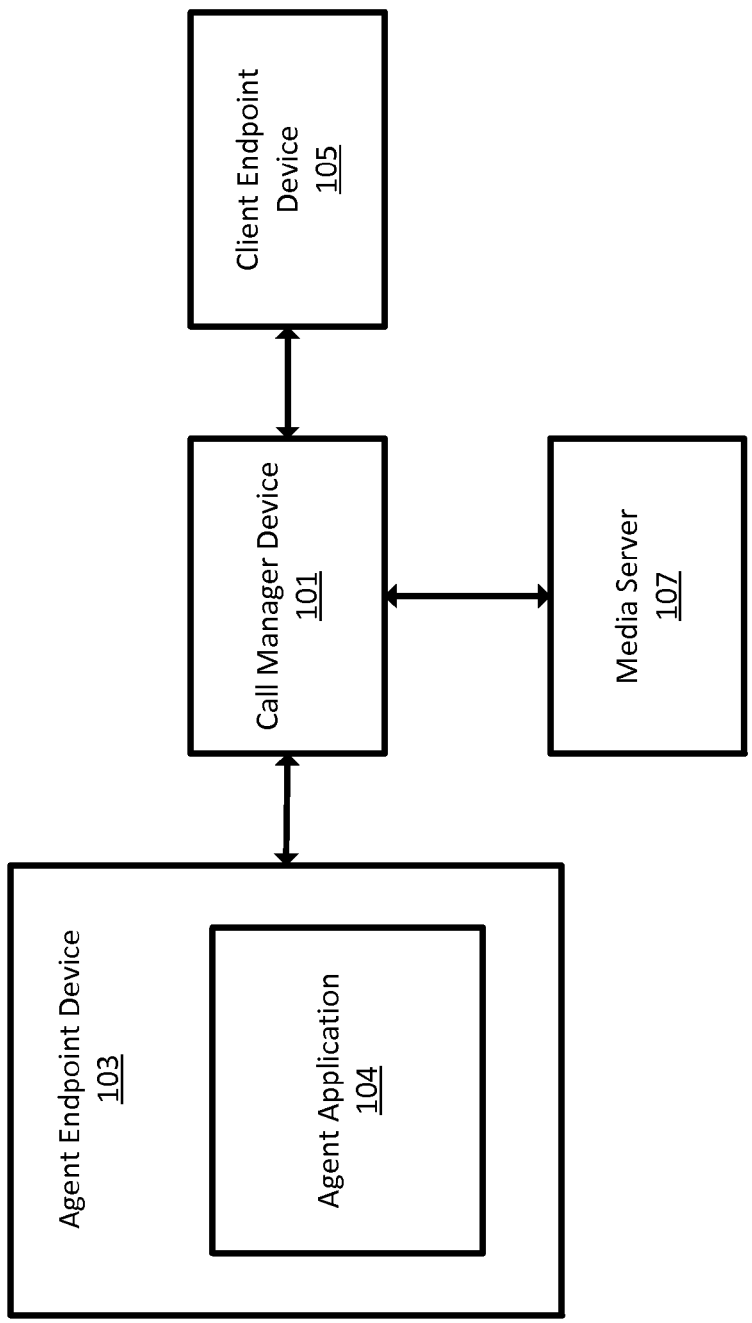
FIG. 1 illustrates an example system for targeted content video delivery.

FIG. 1 illustrates an example system for targeted content video delivery. The system includes a call manager device 101, a media server 107, an agent endpoint device 103, and a client endpoint device 105. Additional, fewer, or different devices may be included in the system for targeted content video delivery. For example, additional call managers may be used. The agent endpoint device 103 may be coupled with an agent side call manager, and the client endpoint device 105 may be coupled with a client side call manager. Multiple client endpoint devices 105 and/or agent endpoint devices 103 may be provided. The agent endpoint device 103 is configured to store and execute an agent application 104. The agent application 104 includes an interface for selection of a video for targeted content video delivery. The agent application 104 may generate and send messages or signals to communicate with the call manager device 101. An example agent application 104 may include a computer telephone integration (CTI) application or interface. The CTI application or interface may include telephone (e.g., soft phone) controls and a list of videos or video streams available to the agent endpoint device 103.

The client endpoint device 105 may be a video kiosk. The video kiosk may be located in a business such as a store, a bank, or any location that a customer may seek information. For example, client endpoint devices 105 are placed at branch locations. The client endpoint device 105 could also be a laptop computer, a tablet computer, a mobile telephone, a personal digital assistant (PDA), a smart phone, or any device capable of network communication and display of streaming video. The streaming video may be in a variety of standard or high definition formats including $3^{rd}$ generation partnership project (3GPP), motion picture experts group (MPEG-4), real time streaming protocol (RTSP), Flash, or another format which may be delivered using real time transport (RTP) or another delivery protocol.

Example businesses for the client endpoint device 105 includes a bank, a store, or any business where a live person typically provides specialized information to a customer. In a store, a customer may be interested in receiving help regarding a product sold in the store. For example, a customer may enter a hardware store seeking help for installing bathroom tile, removing a clog from a drain, or building a deck. Many large hardware stores may employ an onsite expert for floor construction, another expert for plumbing, and a third expert for carpentry. As another example, a consumer electronics stores may have agents versed in particular lines of products. However, in many of these settings, advice may be delivered to the customer just as effectively and more economically using a call center accessed by the video kiosk.

Using the client endpoint device 105, the user initiates a communication session to the agent endpoint device 103. The communication session may be a voice over internet protocol (VoIP) call. The communication session may be signaled and set up using session initiation protocol (SIP). SIP may be defined according to requests for comments (RFC) 3261 as published in June 2002 and available at http://tools.ietf.org/html/rfc3261. Other communications and/or protocols may be used.

The call manager device 101 may be a server or another network device. The call manager device 101 is configured to process and manage VoIP or other calls. The call manager device 101 may administer SIP, skinny client control protocol (SCCP), H.323, media gateway control protocol (MGCP), or other protocols. H.323 may be defined according to the international telecommunication union recommendation H.232 "Packet-based multimedia communication systems," as published in December 2009 and available at http://www.itu.int/rec/T-REC-H.323/. MGCP may be defined according to RFC 2805 as published in April 2000 and available at http://tools.ietf.org/html/rfc2805. The call manager device 101 may be referred to as a call control server.

The agent endpoint device 103 is configured to access a list of pre-recorded videos, for example, through the agent application 104. When the agent determines that a common issue, question, or problem relates to one of the list of pre-recorded videos, the agent selects the video using the agent application 104. In response, the agent endpoint device 103 interrupts the communication session with the client endpoint device 105. The agent endpoint device 103 initiates a new communication session between the client endpoint device 105 and the media server 107. The agent endpoint device 103 via the agent application 104 may generate a command message including data indicative of the video selected by the agent. In response, the media server 107 sends the video to the client endpoint device 105.

Figure 2:
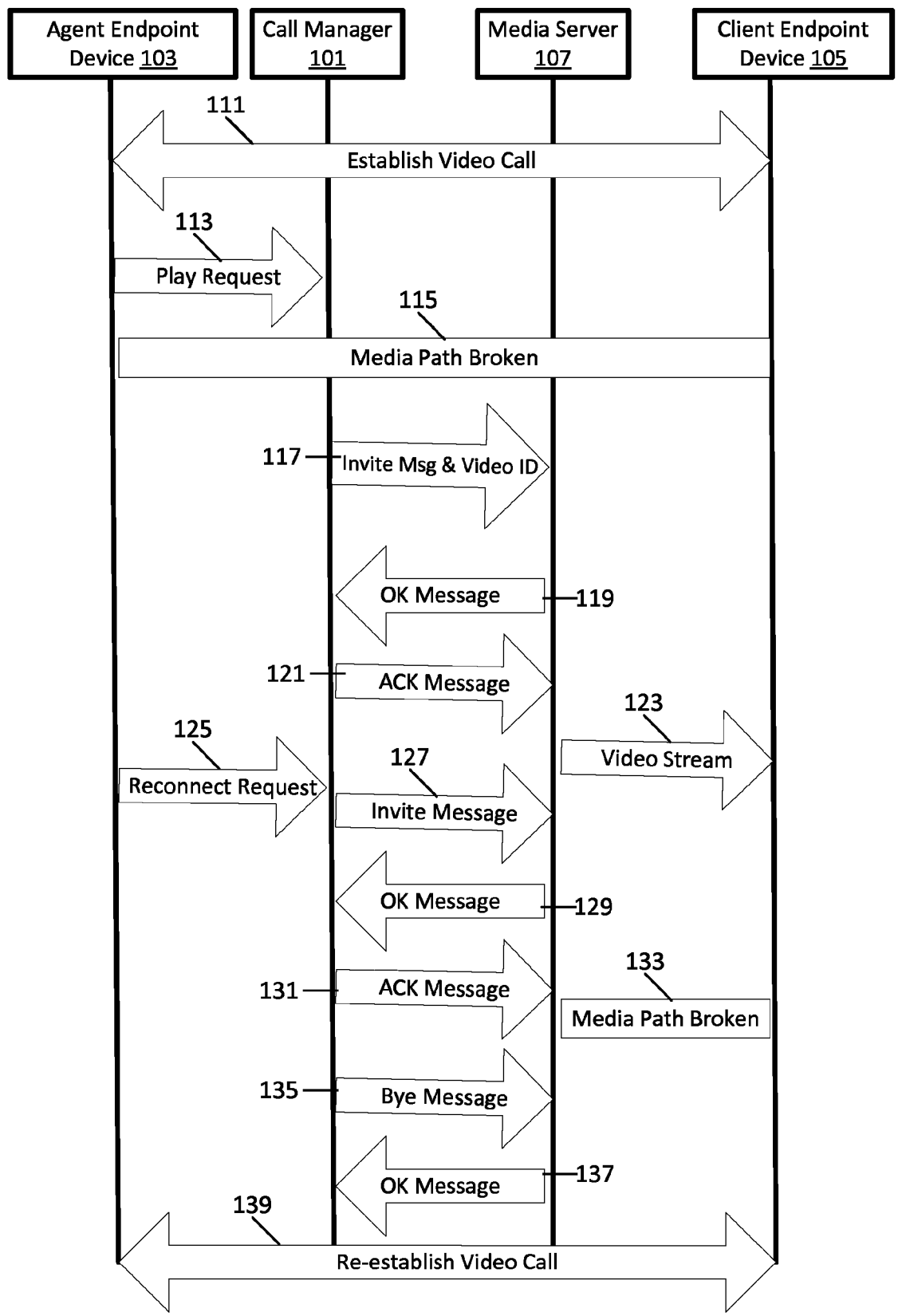
FIG. 2 illustrates an example call flow for targeted content video delivery.

FIG. 2 illustrates an example call flow for targeted content video delivery using the system of FIG. 1. The call flow illustrates communications among the call manager device 101, the media server 107, the agent endpoint device 103, and the client endpoint device 105.

At stage 111, an initial communication session between the agent endpoint device 103 and the client endpoint device 105 (e.g., client phone) is established. The communication session may be a video call. The communication session may be initiated by either the agent endpoint device 103 or the client endpoint device 105. For example, the client endpoint device 105 may be a video kiosk at a department store. A customer may sit at the video kiosk and activate (e.g., keypress, touchscreen) a start command, which initiates the communication session to the agent endpoint device 103.

As another example, the customer may have sent an email request or a voicemail request for customer service. The agent endpoint device 103 initiates the communication session to the client endpoint device 105 to answer the customer's request.

The communication session may be established using any signaling protocol. The establishment of the communication may include signaling messages such as invite messages, OK messages, and acknowledgement messages between the agent endpoint device 103 and the client endpoint device 105 directly or through an intermediary device such as the call manager 101.

The agent endpoint device 103 may include a graphical user interface for interacting with the communication session. The agent endpoint device 103 may include a CTI interface. The CTI interface includes controls for selecting videos. Through the communication session, the agent determines the specifics of the customer's inquiry. Common customer inquiries are addressed by pre-recorded videos. The pre-recorded videos may include instructions for the customer.

The CTI interface may also include various features such as call information display, automatic dialing, phone control, extended call features, auxiliary transfers, and/or statistics features. Automatic dialing may include dialing a set of predetermined numbers in a specific order or dialing multiple numbers and connecting the agent when one of the called parties answers. The phone control may include manual dialing, answer, hang up, place on hold, play video stream, reconnect with client or other phone controls such. The phone control may generate CTI commands based on user input (e.g., keypress or touchscreen). The auxiliary transfers may include transfers in addition to the video in the communication session such as data transfers.

The call information display may include the number of the calling party, the number dialed, a duration of the call, a name of the calling party, or other information. The agent endpoint device 103 may be configured to interpret data from the automated number identification (ANI) service to generate the number of the calling party. The agent endpoint device 103 may also be configured to interpret data from the dialed number identification service (DNIS) to generate the number of the called party. Through DNIS, multiple telephone numbers may be used to connect to the agent endpoint device 103, and the agent endpoint device 103 is configured to distinguish between the numbers in order to provide different features and services based on the number dialed. In one instance, the agent endpoint device 103 is configured to distinguish between different businesses through DNIS. The agent endpoint device 103 is configured to access different video libraries according to DNIS.

The extended call features may include a call transfer function and a conference function. In the call transfer function, the agent endpoint device 103 receives a call from a calling party and connects the calling party to another endpoint device. The call transfer function may be configured to transfer a communication session with the client endpoint device 105 from the agent endpoint device 103 to the media server 107.

Statistics features may reflect the performance of the agent or the call center. Example statistics may include the average length of the communication sessions, the number of communication sessions handled by various agent endpoint devices, the types of communication sessions handled by various agent endpoint devices, or other parameters. The statistics may also be calculated according to video index values. For example, the statistics may include the frequency that each video is used or the statistics may include a percentage of communication sessions or a percentage of the duration of communication sessions that utilize a video.

At stage 113, the call manager 101 receives a play request from the agent endpoint device 103. The play request may include a video index value or video identifier and session information of the agent endpoint device 103 such as IP address, ports, quality metrics, call dialog information and media direction as send-only. The play request may be a hold request as defined under SIP or another signaling protocol.

The video index value indicates a video selected by the agent endpoint device 103 and/or the CTI interface. The video index value may be numeric or alphanumeric. The video index value may be descriptive of the content of the video (e.g., loanapplication) or descriptive of the location of the customer endpoint device or video kiosk (e.g., bankname). The video index value may describe the content and the location of the customer endpoint device or video kiosk in an address format (loanapplication@bankname.com). The video index value may alternatively or additionally be a function of the DNIS data indicative of the number of the calling party or a randomly or pre-determined index value unrelated to description or call number. In this way, the agent endpoint device 103 sends the calling party number to the media server 107.

At stage 115, the call manager 101 interrupts the communication session between the agent endpoint device 103 and the client endpoint device 105 in response to the play request from the agent endpoint device 103. The interruption of the communication session may include an invite message 117 (e.g., a SIP invite message) sent by the call manager 101 to the media server 107. The invite message 117 includes the video index value or another video identifier. The invite message 117 may optionally also include a unique identifier for the call, the destination address, a calling party address, and information about the type of session that the calling party wishes to establish.

The invite message may be an invite without any session information (e.g., designated by "CS-IP no SDP"). In response to an invite without any session information, the media server 107 generates a response. The media server 107 may be configured to respond to this type of invite with all codecs that the media server 107 can play the video stream with and the IP address and port from which media server 107 is configured to stream the video. The call manager 101 negotiates the common codec between the media server 107 and the client endpoint device 105 and signals the media server 107 to play the video stream to the port of the client endpoint device 105. The media server 107 transmits the video in the format negotiated by call manager 101.

As an alternative to the embodiment shown in FIGS. 1 and 2, the system may include multiple media servers. The invite message generated by the call manager 101 may select one of the media servers randomly, accordingly to geography, according to a subscription level of the client endpoint device 105, or according to the bandwidth or processing capabilities of the client endpoint device 105.

The interruption of the communication session may also include an OK message 119 (e.g., SIP 200 OK message) generated and returned by the media server 107 in response to the invite message 117. The call manager 101 may generate and send an acknowledgement (ACK) message 121 back to the media server 107. The ACK message may contain the IP address, port, codecs and the resolution that the client endpoint device 105 supports.

At stage 123, the media server 107 transmits the video stream in the resolution that the client endpoint device 105 supports through a second communication session. Alternatively, the same communication session is transferred, creating the second communication session.

The second communication session may be unidirectional because during the video stream the client endpoint device 105 need not communicate back to the media server 107. In another example, the communication session includes a control path from the client endpoint device 105 to the media server 107 to give the option of controlling the video stream to the client endpoint device 105. The control of the video stream may include a pause command, a rewind command, a fast forward command, and/or a stop command.

Alternatively, the video stream may loop after the video selected according to the video index value has finished playing. The looping video is stopped when the agent returns his attention to the customer and re-establishes the initial communication session. For example, the agent endpoint device 103 may generate a reconnect request 125 (e.g., reconnect to client request) and send the reconnect request 125 to the call manager 101. The reconnect request 125 may be a resume request as defined by SIP or another signaling protocol. The reconnect request 125 may include data for the call manager 101 to associate the reconnect request 125 with the video stream. The data may be any combination of the video index value, the number of the calling party, or the address of the client endpoint device 105.

The interruption of the communication session may include an invite message 127 (e.g., a SIP invite message) sent by the call manager 101 to the media server 107. The invite message 127 includes the data for the media server 107 to associate the reconnect request 125 with the video stream. The data may be any combination of the video index value, the number of the calling party, or the address of the client endpoint device 105.

The interruption of the video session in response to the reconnect request 125 may also include an OK message 129 (e.g., SIP 200 OK message) generated and returned by the media server 107 in response to the invite message 117. The call manager 101 may generate and send an acknowledgement (ACK) message 131 back to the media server 107. Optionally, the call manager 101 may send a BYE message 135 to the media server 107, which generates another ACK message 137 in return. Various other signaling mechanisms may be involved in stage 139 to re-establish the initial communication session (e.g., video call).

Figure 3:
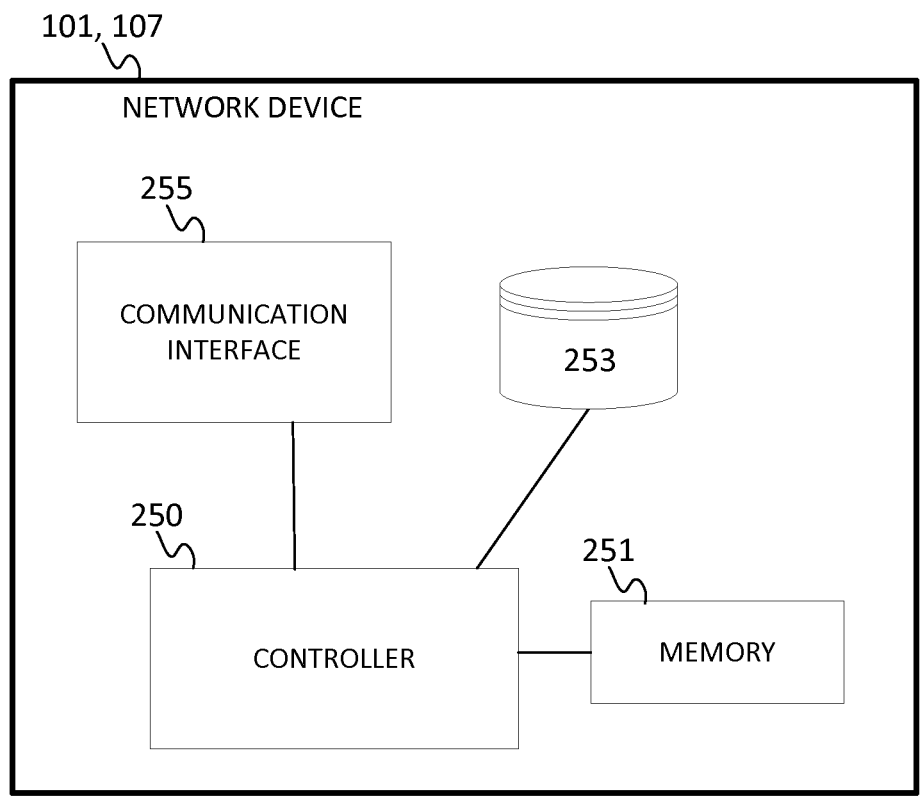
FIG. 3 illustrates an example network device of the system of FIG. 1.

FIG. 3 illustrates an example network device of the system of FIG. 1. The network device includes at least a memory 251, a controller 250, and a communication interface 255. In one example, a database 253 stores possible video files and video index values. Additional, different, or fewer components may be provided. Different network devices may have the same or different arrangement of components. The network device may correspond to the call manager 101 and/or the media server 107.

Figure 4:
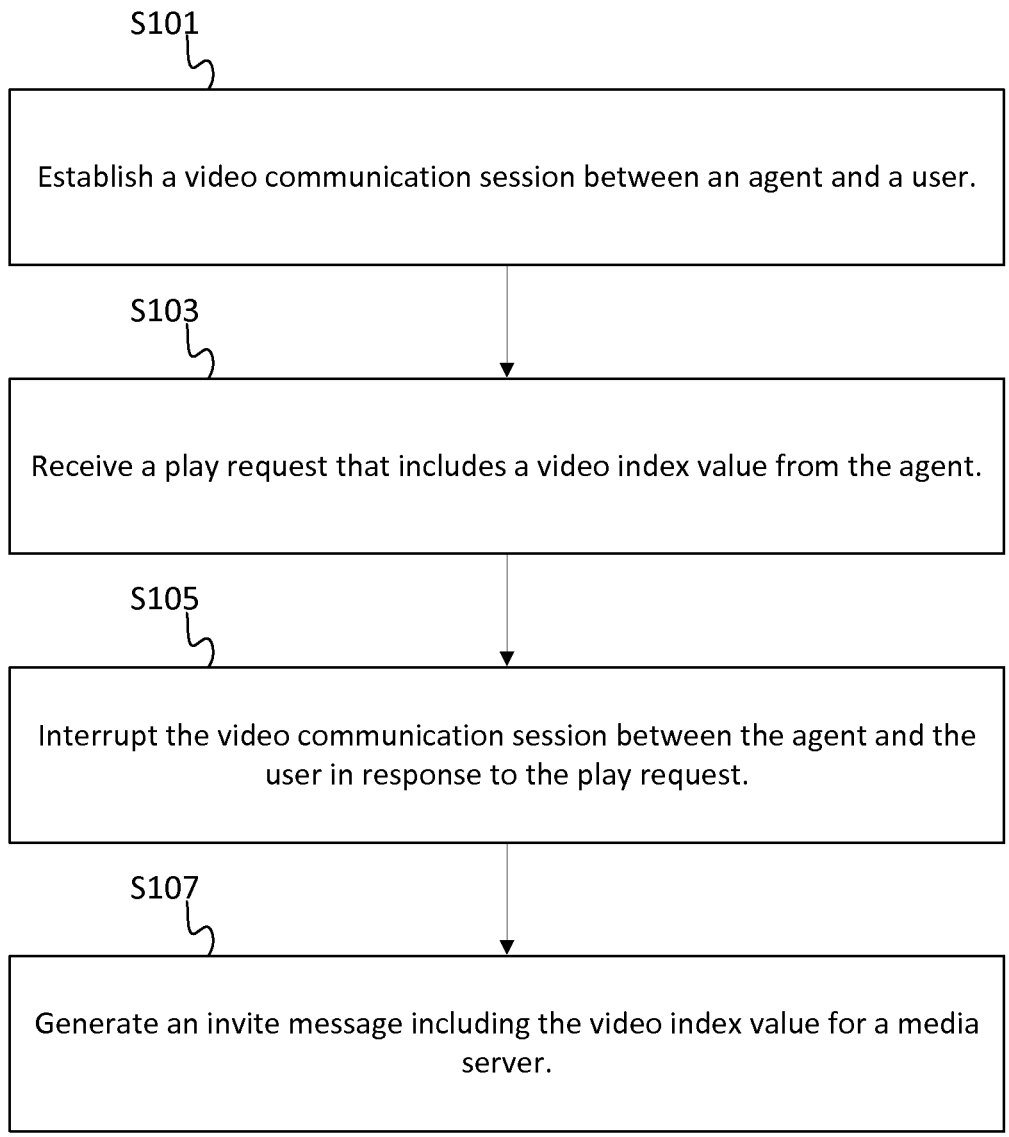
FIG. 4 illustrates an example flow chart for targeted content video delivery by a network device of FIG. 3.

FIG. 4 illustrates an example flow chart for targeted content video delivery by the network device of FIG. 3 as a call manager 101. Additional, different, or fewer acts may be provided. The acts are performed in the order shown or other orders. The acts may also be repeated.

At act S101, the communication interface 255 establishes a video communication session between an agent and a user. The video communication session may be initiated by the user or by the agent. For example, the user may visit a business that provides video kiosks to handle customer inquiries. The user initiates the video communication session via the video kiosk.

The agent and user may discuss the customer's inquiry through the video communication session. At some point, the agent may realize that the customer has a common problem or requests common information. The agent selects a video that corresponds to the problem or information. The agent's device generates a video index value that corresponds to the problem or information and a play request that includes the video index value.

At act S103, the controller 250 receives the play request that includes the video index value from the agent. The controller 250 may analyze the video index value to determine which of several media servers includes the video corresponding to the video index value. For example, the database 253 may include a lookup table that associates video index values with internet protocol (IP) addresses of the locations of the corresponding videos.

At act S105, the call manager 101 interrupts the video communication session between the agent and the user in response to the play request. The video communication session may be suspended in response to control message (e.g., SIP message).

At act S107, the controller 250 generates an invite message including the video index value and the address of the selected media server. The invite message is sent to the selected media server by the communication interface 255. A second video communication session is established between the user and the selected media server to stream the video assigned to the video index value to the user. When the video is complete, the original video communication session between the agent and the user is reestablished. At this point, the agent may answer additional questions or clarifications from the client, which may cause the agent to identify another pre-recorded video, which triggers another play request and repeat of the acts S101-S107 one or more times.

The media server may return a message that includes a duration of the video and/or acknowledging receipt of the invite message from the call manager 101. Alternatively, the duration of the video may be stored by the database 253. The call manager 101 may relay the duration of the video to the agent device. The agent device or the call manager 101 may be configured to determine a projected hold time based on the duration of the video. The projected hold time and the duration of the video may be equal. Alternatively, the projected hold time may consider time for establishing and interrupting the communication sessions, or the projected hold time may consider the likelihood of the customer replaying or pausing the video.

The call manager 101 or the agent device may be configured to assign a task to the agent device that corresponds to the projected hold time. Possible tasks may be fielding another incoming call, taking a break, completing a worksheet regarding the video communication session, or another task. The incoming call that is to be fielded by the agent while the media server is playing the video for the user may be selected from a variety of types of incoming calls that each have various average durations. The type of incoming call may be selected to correspond to the projected hold time.

Figure 5:
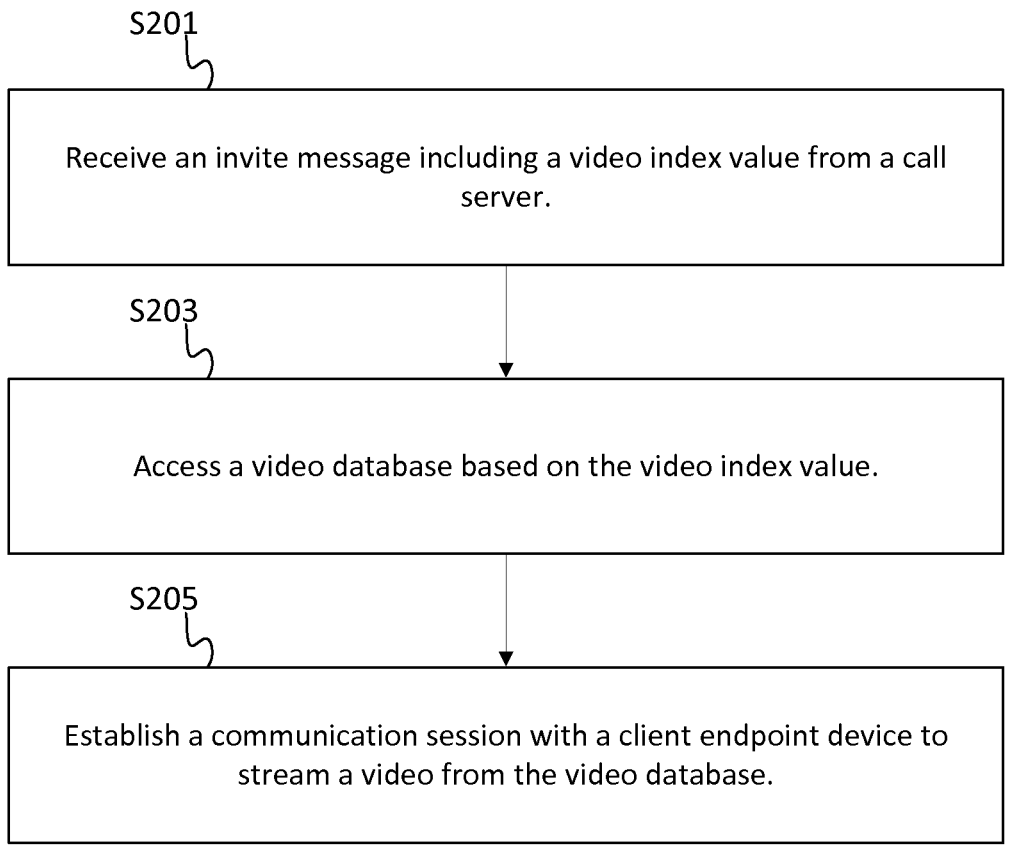
FIG. 5 illustrates another example flowchart for targeted content video delivery by a network device of FIG. 3.

FIG. 5 illustrates an example flow chart for targeted content video delivery by the network device of FIG. 3 as a media server 107. Additional, different, or fewer acts may be provided. The acts are performed in the order shown or other orders. The acts may also be repeated.

At act S201, the media server 107 receives an invite message from a call control server (e.g., call manager 101). The call control server may be one of multiple call control servers for a call center. Each of the multiple call control servers may manage a group of agents, each associated with an agent device (e.g., a computer and/or a VoIP phone). The invite message may include an address for the agent device, an address for a client device, and a video request.

The video request may be based on information from the client device received at the agent device. For example, the agent and the client may be engaged in an audio or video communication session in which the client asks the agent a series of questions or provides the agent with information related to the reason the client has requested help. When the agent identifies the problem, the agent may select the client's problem from a list and make a selection on the agent device. The agent device generates a data packet including a description or an identifier that corresponds to the selection, which may be referred to as a video request.

At act S203, the media server 107 accesses a video database based on the video request for a video corresponding to the video request. The video database may include various videos that address common or uncommon inquiries or problems in a variety of businesses. The videos may include instructions related to operation of a product, a home construction project, a financial instrument, or a government registration procedure. For example, the videos may include instructions to build a deck, instructions to unlock a cellular phone, an explanation of what items are needed when visiting the department of motor vehicles, an explanation of investment strategies offered, or many other topics.

Each or some of the videos may be stored in multiple formats or codecs. In one example, the request from the client device indicates the bandwidth, resolution, display, or processing capabilities of the user device so that an appropriate video is selected. The bandwidth may be a data transfer rate (e.g., 1 megabits per second or 100 kilobytes per second) or a connection type (e.g., 4G, fiber optics, integrated services digital network, WiMAX, or other types). The display information may specify a display size measured in pixels or length, a ratio between the dimensions, and/or resolution. The resolution may include standard or high definition. The controller 250 of the media server 107 is configured to analyze the request to identify parameters of the client device and select a video based on a combination of the parameters and the video index value. The videos may be organized by type, format, and codec.

At act S205, the media server 107 is configured to establish a second communication session. The second communication session is between the media server 107 and the client device. The communication session includes the video from the video database that was selected by the media server 107. When the video content has played to completion, the media server 107 or the client device notifies the call control server, and the call control server sends a message to the agent device. In one example, the agent device requests that the call control server reestablish the initial communication session or establish a new session between the agent device and the client device. In another example, the initial communication sensor is reestablished automatically by the call control server. In either example, the call control server may generate and send a signaling message that is an invite with inactive session description protocol (SDP) to the media server. At this point, the agent may answer additional questions or clarifications from the client, which may or may not cause the agent to identify another pre-recorded video, which triggers another hold request and repeat of the acts S201-S205 one or more times.

Referring back to FIG. 3, the controller 250 may include a general processor, digital signal processor, an application specific integrated circuit (ASIC), field programmable gate array (FPGA), analog circuit, digital circuit, combinations thereof, or other now known or later developed processor. The controller 250 may be a single device or combinations of devices, such as associated with a network, distributed processing, or cloud computing.

The memory 251 may be a volatile memory or a non-volatile memory. The memory 301 may include one or more of a read only memory (ROM), random access memory (RAM), a flash memory, an electronic erasable program read only memory (EEPROM), or other type of memory. The memory 301 may be removable from the network device, such as a secure digital (SD) memory card.

In addition to ingress ports and egress ports, the communication interface may include any operable connection. An operable connection may be one in which signals, physical communications, and/or logical communications may be sent and/or received. An operable connection may include a physical interface, an electrical interface, and/or a data interface.

The network may include wired networks, wireless networks, or combinations thereof. The wireless network may be a cellular telephone network, an 802.11, 802.16, 802.20, or WiMax network. Further, the network may be a public network, such as the Internet, a private network, such as an intranet, or combinations thereof, and may utilize a variety of networking protocols now available or later developed including, but not limited to TCP/IP based networking protocols.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored. The computer-readable medium may be non-transitory, which includes all tangible computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

As used in this application, the term 'circuitry' or 'circuit' refers to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device.

Processors suitable for the execution of a computer program include, by way of example, both general and special purpose microprocessors, and anyone or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

We claim:

1. A method comprising:
    establishing an initial video call between an agent device and a user device;
    receiving a play request from the agent device, during the video call, wherein the play request includes a video index value;
    interrupting the video call between the agent device and the user device in response to the play request;
    sending an invite message to a media server, wherein the invite message includes the video index value;
    establishing a streaming content session between the user device and the media server at a resolution compatible with the user device as defined by the video index value;
    interrupting the streaming content session between the user device and the media server; and
    reestablishing the initial video call between the user device and the agent device.

2. The method of claim 1, wherein the streaming content session includes instructions based on a customer inquiry and the media session is unidirectional.

3. The method of claim 1, wherein the invite message is generated according to session initiation protocol.

4. The method of claim 1, further comprising:
    receiving data indicative of a projected hold time corresponding to the video index value; and
    assigning a task to the agent device, wherein the task corresponds to the projected hold time.

5. An apparatus comprising:
    a communication interface configured to establish an initial video call between an agent device and a user device; and
    a controller configured to interrupt the initial video call between the agent device and the user device in response to a hold request received from the agent device, wherein the hold request includes a video index value,
    wherein the controller is configured to establish a streaming content session between the user device and a media server at a resolution compatible with the user device as defined by the video index value, wherein the controller is configured to interrupt streaming content session between the user device and the media server and, in response, reestablish the initial video call between the user device and the agent device.

6. The apparatus of claim 5, wherein the controller is configured to generate an invite message for the media server, wherein the invite message includes the video index value.

7. The apparatus of claim 6, wherein the media session is established between the user device and the media server based on the invite message and the initial video call.

8. The apparatus of claim 7, wherein the media session includes a streaming video associated with the video index value.

9. The apparatus of claim 8, wherein the streaming video includes instructions based on a customer inquiry and the media session is unidirectional.

10. The apparatus of claim 6, wherein the controller is configured to assign a task to the agent device based on a projected hold time associated with the video index value.

11. A method comprising:
receiving an invite message from a call manager that established a video call between a client endpoint device and an agent endpoint device, wherein the invite message includes an address for the client endpoint device and includes a video request based on a request from the client endpoint device;
accessing, at a server, a video database based on the video request for a video corresponding to the video request;
establishing a communication session between the server and the client endpoint device, wherein the communication session includes the video from the video database; and
receiving an interrupt signal configured to break the communication session with the client endpoint device, wherein the interrupt signal is generated in response to a user input from the client endpoint device or in response to a resume call request from the agent endpoint device, wherein the video call is reestablished in response to the interrupt signal.

12. The method of claim 11, wherein the video includes instructions related to operation of a product, a home construction project, a financial instrument, or a government registration procedure.

13. The method of claim 11, wherein the communication session is established using session initiation protocol (SIP).

14. An apparatus comprising:
a database configured to store video files in multiple resolutions, wherein different resolutions of a video are associated with different video index values;
a controller configured to extract a video index value from a session message from a call manager associated with a video call between a client endpoint device and an agent endpoint device and generate a database query including the video index value; and
a communication interface configured to establish a communication session with the client endpoint device, wherein the communication session includes a video from the database with a resolution compatible with the client endpoint device according to the video index value,
wherein an interrupt signal instructs the controller to break the video call with the client endpoint device, wherein the interrupt signal is generated in response to a user input from the client endpoint device or in response to a resume call request from the agent endpoint device, wherein the video call is reestablished in response to the interrupt signal.

15. The apparatus of claim 14, wherein the video includes instructions related to operation of a product, a home construction project, a financial instrument, or a government registration procedure.

* * * * *